US011631185B1

(12) United States Patent
Piety et al.

(10) Patent No.: US 11,631,185 B1
(45) Date of Patent: Apr. 18, 2023

(54) SYNCHRONIZATION OF INPUT DATA ACQUISITION AND CAMERA CAPTURE OF RESPONSE FOR MODAL ANALYSIS

(71) Applicant: RDI TECHNOLOGIES, INC., Knoxville, TN (US)

(72) Inventors: Kenneth Ralph Piety, Knoxville, TN (US); Jeffrey R. Hay, Prospect, KY (US); Douglas A. Mann, Farragut, TN (US)

(73) Assignee: RDI TECHNOLOGIES, INC., Knoxville, TN (US)

( * ) Notice: Subject to any disclaimer, the term of this patent is extended or adjusted under 35 U.S.C. 154(b) by 0 days.

(21) Appl. No.: 17/882,118

(22) Filed: Aug. 5, 2022

Related U.S. Application Data

(60) Provisional application No. 63/232,765, filed on Aug. 13, 2021.

(51) Int. Cl.
*H04N 7/18* (2006.01)
*G06T 7/246* (2017.01)
*G01M 7/02* (2006.01)
*H04N 5/77* (2006.01)
(52) U.S. Cl.
CPC ............ *G06T 7/248* (2017.01); *G01M 7/025* (2013.01); *H04N 5/77* (2013.01); *G06T 2207/10016* (2013.01)

(58) Field of Classification Search
CPC ......... G06T 7/248; G06T 2207/10016; G01M 7/025; H04N 5/77
USPC ................ 348/135, 136, 137, 140, 142, 143
See application file for complete search history.

(56) References Cited

U.S. PATENT DOCUMENTS 8,705,047 B2 * 4/2014 Jiang .................. G01B 9/02083
356/497
10,977,800 B1 * 4/2021 Hay ....................... H04N 7/181

* cited by examiner

*Primary Examiner* — Robert Chevalier
(74) *Attorney, Agent, or Firm* — Wyatt, Tarrant & Combs, LLP; Stephen C. Hall

(57) ABSTRACT

A method for non-contact modal analysis uses an optical sensing device such as a video camera. Unlike traditional modal analysis, requiring accelerometers or force sensors to measure the modal characteristics of a structure, the inventive system uses pixel displacement measurements from the optical sensor to characterize the modal properties of the device under test. The input or reference signal is measured by an independent data acquisition system and is synchronized with the response motion captured in video recordings.

12 Claims, 18 Drawing Sheets

7.20 Embedded Image Information

This setting controls the frame-specific information that is embedded into the first several pixels of the image. The first byte of embedded image data starts at pixel 0,0 (column 0, row 0) and continues in the first row of the image data: (1,0), (2,0), and so forth. Users using color cameras that perform Bayer color processing on the computer must extract the value from the non-color processed image in order for the data to be valid.

> Note: Embedded image values are those in effect at the end of shutter integration.

Each piece of information takes up 32-bits (4 bytes) of the image. When the camera is using an 8-bit pixel format, this is 4 pixels worth of data.

The following frame-specific information can be provided:
- → Timestamp
- → Gain
- → Shutter
- → Brightness
- → White Balance
- → Frame Counter
- → Strobe Patern Counter
- → GPIO Pin State ⎯ 500

If you turned on all possible options the first 40 bytes of image data would contain camera information in the following format, when accessed using the FlyCapture 2 API:

Figure 4

SYNCHRONIZATION OF INPUT DATA ACQUISITION AND CAMERA CAPTURE OF RESPONSE FOR MODAL ANALYSIS

CROSS REFERENCE TO RELATED APPLICATIONS

This application claims the benefit of priority to U.S. Provisional Application No. 63/232,765, which was filed Aug. 13, 2021, the contents of which are incorporated herein by reference.

FIELD OF INVENTION

Multiple embodiments described and provided for herein pertain to systems, apparatuses, and methods for performing a modal test of machinery, machine components, and inanimate physical structures where the input signal measured by an independent data acquisition system is synchronized with the response motion captured in video recordings.

BACKGROUND

In traditional modal analysis, the frequency response function (FRF) can be estimated from exciting the structure with an input signal such as an impact hammer or shaker exciter and measuring the response at various locations on the structure. Conventional modal analysis techniques require simultaneous data acquisition of both the input stimulus and the output response to compute the modal characterization of the device under test (DUT), sometimes referred to herein synonymously as the "structure." This is typically performed with a multichannel data acquisition system (DAQ) utilizing a synchronized analog to digital converter (ADC) for each channel. The input signal would typically be the voltage from a force sensor integrated in an impact hammer or mounted at the end of a shaker table stinger probe. The output signal(s) in response would be a voltage from one or more sensors that measure either displacement (eddy current probe), velocity (velometer), or acceleration (accelerometer). For conventional modal analysis it is essential that the causality of the input to output measurement is preserved, meaning that the time-varying response measured at the output can be aligned with the time-varying input signal on the same time axis.

The inventive system uses an optical sensor in the place of a displacement or acceleration sensor to measure the response of the structure. To achieve usable modal analysis results, it is essential to ensure that the phase of the excitation signal with respect to the measured response is preserved. In a traditional modal analysis system, this would be accomplished using a synchronized multichannel DAQ. A synchronized DAQ would ensure that all channels are sampled simultaneously so that the respective phase information is preserved. This approach is no longer possible when the response motion of the structure is measured with a camera. The disparate sources of the input signal and the video stream from the camera must be synchronized to perform a valid modal test.

SUMMARY

In some embodiments for performing modal tests in accordance with the present embodiments, input signals are measured using a traditional DAQ suitable for vibration analysis (≤200 kHz sample rate) which is capable of analyzing vibration frequencies up to 80 kHz. However, the response motion of the structure is measured using a high-speed, high-resolution camera. Using image processing techniques, the motion of specific features (points, edges, and objects) at multiple spatial locations can be tracked frame to frame to create an output displacement measurement for each feature. Each displacement measurement is analogous to an output sensor in a traditional modal analysis scenario. Since the input and output signals are measured by two disparate data acquisition systems, a synchronization clock must be incorporated into both systems to properly interpret the data collected from the device under test (DUT). The input signal from the DAQ and the output signals from the camera must be time-synchronized. The sample rates of vibration analysis DAQs are typically selected by the user with maximum values of 100K-200K samples per seconds, whereas the camera frame rates are typically less than a few hundred frames per second. Thus, systems according to this application may execute machine-readable program instructions (i.e., a computer program) to perform digital signal processing techniques to ensure a camera frame time basis congruent with the DAQ time basis to facilitate the calculation of traditional input-to-output algorithms used in modal analysis.

BRIEF DESCRIPTION OF DRAWINGS

The drawings and embodiments described herein are illustrative of multiple alternative structures, aspects, and features of the present embodiments, and they are not to be understood as limiting the scope of present embodiments. It will be further understood that the drawing figures described and provided herein are not to scale, and that the embodiments are not limited to the precise arrangements and instrumentalities shown.

FIG. 4 shows a setting control that serves as an example of how information defining the setup and synchronization of the camera is embedded in specific bytes of the video frame.

MULTIPLE EMBODIMENTS AND ALTERNATIVES

The embodiments described and provided for herein are directed to performing modal testing on a structure (or machine, or object) using a video recording of the structure acquired with one or more video acquisition devices, such as but not limited to one or more video cameras, webcams, or digital cameras integral in cell phones (for brevity, a "camera" as used herein encompasses all such video acquisition devices). An input acceleration resulting from an excitation source results in excitation events captured and optionally measured by a data acquisition system (DAQ) that produces and records a first signal. In turn, a response exhibited by the structure is acquired by at least one video acquisition device positioned relative to the structure.

There are several advantages to using a camera to measure the response of the motion in structure during a modal test. The camera is a noncontact measurement and thus does not introduce mass loading effects that might compromise the motion measured. Secondly, the camera can measure the data from numerous spatial locations simultaneously. Typically, the response motion in a modal test is measured by one or more sensors which are attached to the structure. In this case the response sensors must be moved to cover all locations where data is to be collected. This becomes very time consuming as the number of spatial locations increases. A typical modal test would frequently require making measurements in excess of 50 spatial locations. When measuring the response motion of the structure using a high-speed, high-resolution camera, the data at all locations can be measured in a matter of seconds. The motion of specific features (points, edges, and objects) at multiple spatial locations can be tracked frame to frame using a variety of optical flow techniques, edge or contrast measurement techniques, or other optical motion measurement techniques familiar to those skilled in the art to create an output displacement measurement for each feature. Each displacement measurement is analogous to an output sensor in a traditional modal analysis scenario measured at the frame rate of the camera.

Figure 1A:
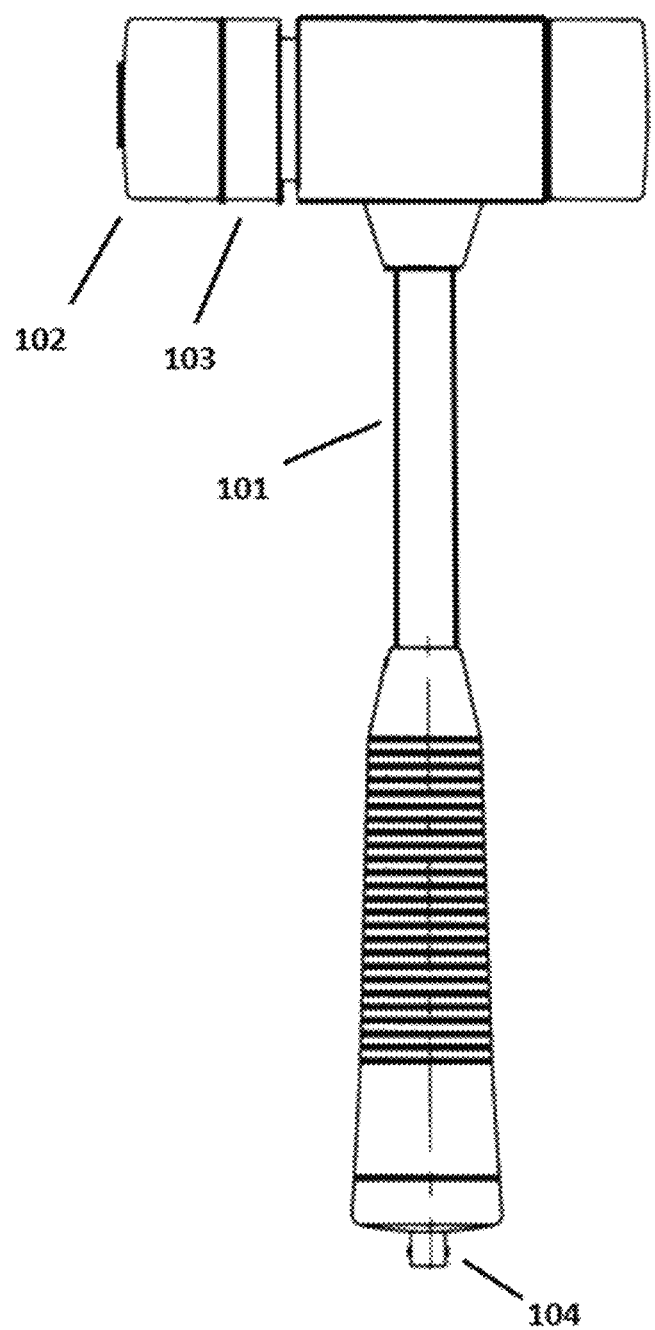
FIGS. 1A and 1B are illustrations of an impact hammer and a shaker device, respectively, which are used in modal analysis testing and otherwise during the practice of multiple embodiments herein.
Figure 1B:
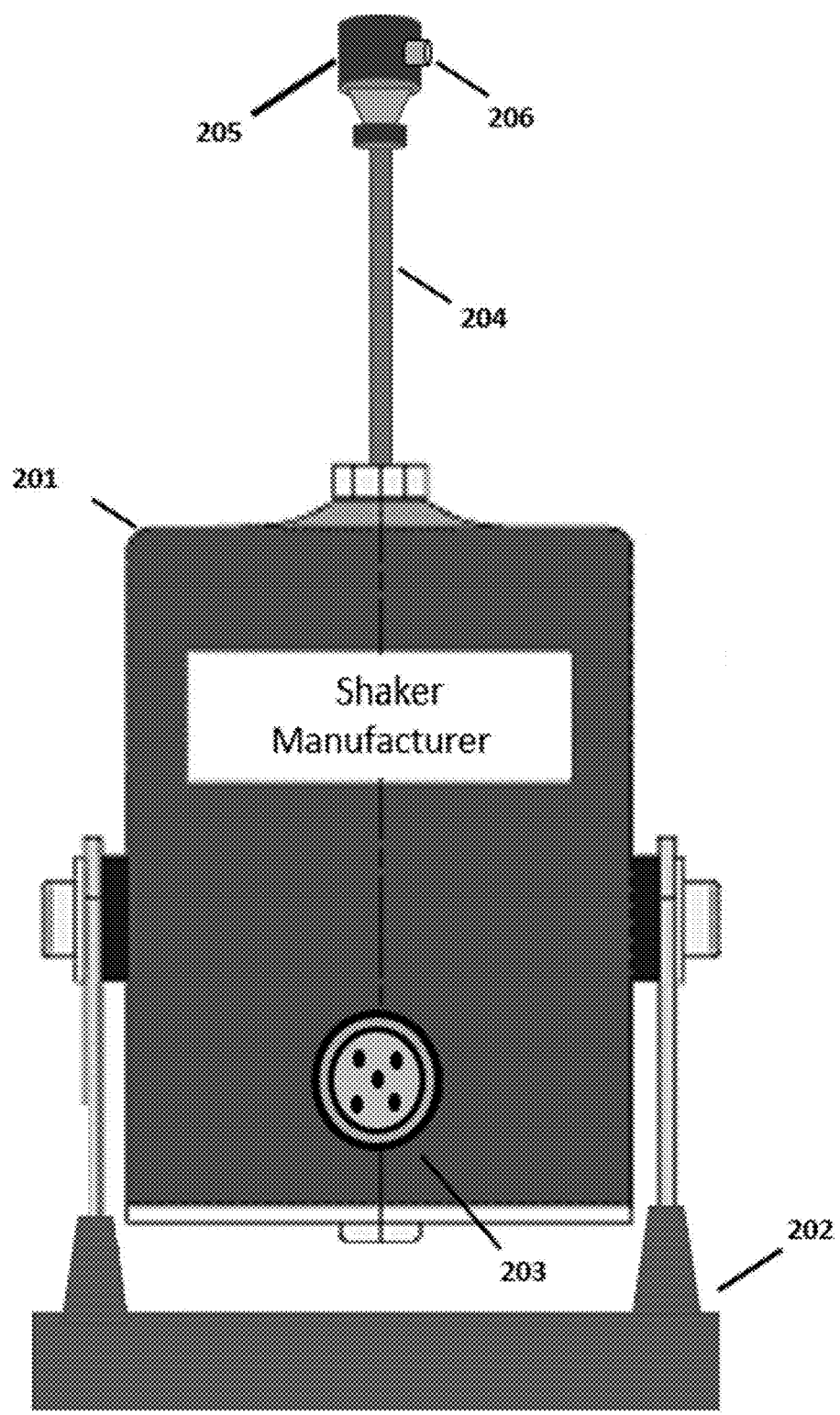

The input signals applied to the structures are generated by the same devices regardless of how the output response is measured. FIG. 1A shows a schematic diagram of an impact hammer having a body 101. Interchangeable tips of varying hardness can be screwed on the end of the impact hammer at position 102 to introduce test signals with different frequency content. The force sensor that measures the impact is located at 103 and the connector for the cable carrying the impact signal is located at 104. FIG. 1B shows a drawing of an electrodynamic modal shaker that can provide the input excitation force for a modal test. The shaker comprises a body 201 and a support base 202. The input power and test signal that drives the shaker is attached via a multi-prong connector 203. Typically the input force is applied to the DUT using a metal rod called a stinger 204 that has a force or impedance sensor, 205, attached at an end which is in contact with the DUT. The input excitation signal is available at the connector shown as 206 to provide an electrical signal related to the acceleration applied to the structure. This signal is normally digitized by the same multichannel DAQ system that processes the output signals. FRF functions derived from the simultaneously sampled signals is the basis for derivative modal parameters.

Figure 2A:
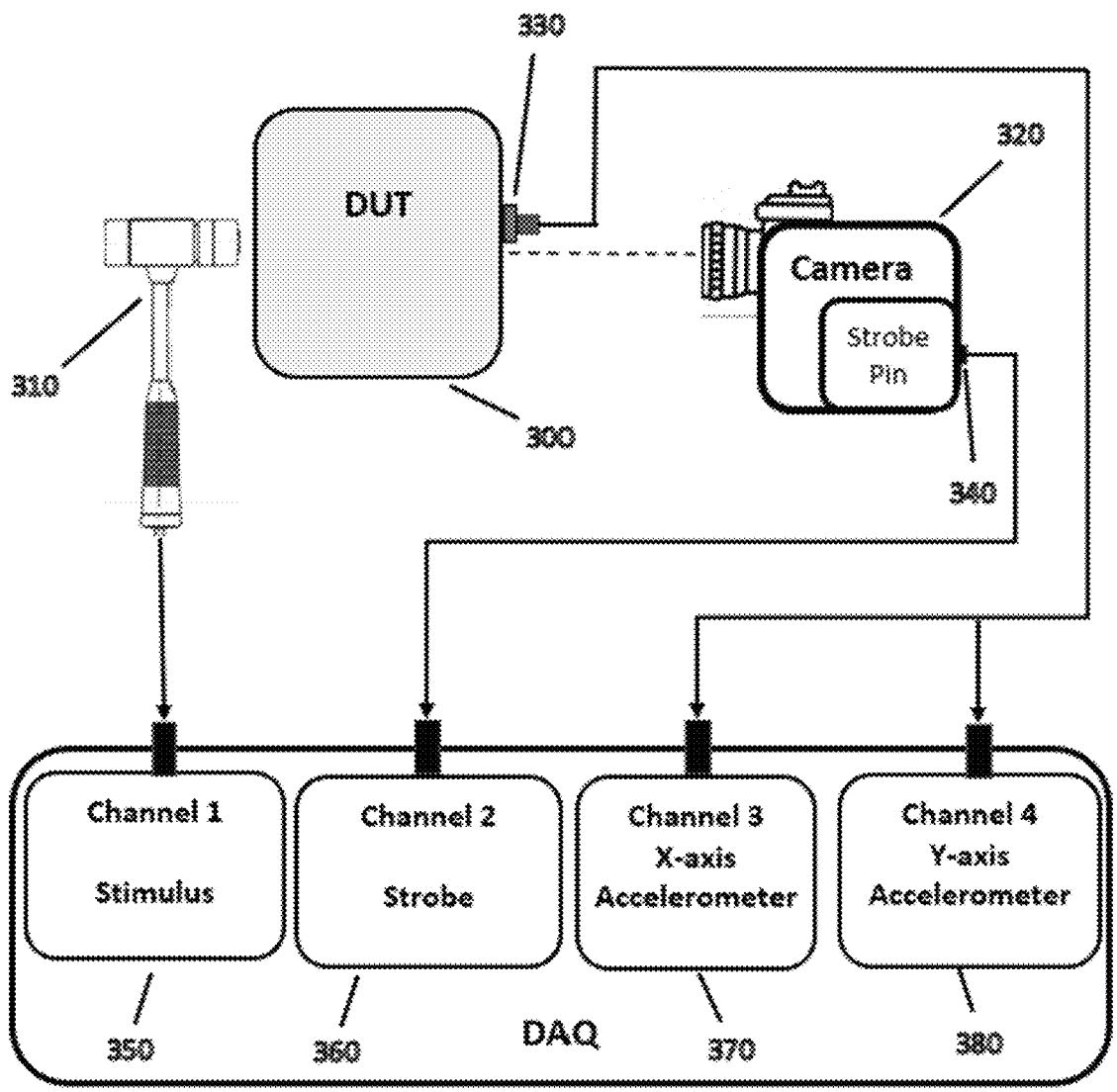
FIG. 2A is a diagram illustration of a problem in the relevant field concerning asynchronous data acquisition that typically occurs during a modal test using an impact hammer as the stimulus.

Since the input and output are measured with separate DAQ systems when using the camera, a synchronization method is needed to obtain input and output signals sampled simultaneously. Herein, two exemplary configurations are provided to perform the DAQ to camera synchronization, depending on whether the hardware configuration provides a shared synchronous capture clock. FIG. 2A presents a first configuration using asynchronous camera and DAQ clocks, thus requiring a software synchronization method to align the clocks.

In the system shown in this configuration, a DUT labelled as 300 is instrumented with multiple measurement sensors. The first sensor is traditionally a force sensor, typically integrated or connected to an impact hammer, 310, or the stinger 204 on a modal shaker. The second sensor is a high-speed, high-resolution camera, 320. The third sensor is a dual axis accelerometer that provides measurements in the same axes as the camera. The data from each of these three sensors is being captured by two separate digital capture devices. The impact hammer force signal is being captured by Channel 1, 350, and the X-axis and Y-axis signals from the accelerometer are being captured by channels 3 and 4, labelled 370 and 380, respectively, of a multichannel ADC which convert the analog voltages to digital signals with a sample rate of 51,200 samples per second in accordance with an exemplary calculation herein. The DUT is also being captured by a video camera 320, with a resolution of 1920×1080 pixels at a sample rate of 128 frames per second. In this configuration both the camera and the ADC have separate sampling clocks, which are ideally configured to run at rates that are more conducive for sample rate conversion, like a rational up/down sample ratio. In this example, the ADC sampling rate is 400 times faster than the camera frame rate, an upsample ratio of 40

Figure 2B:
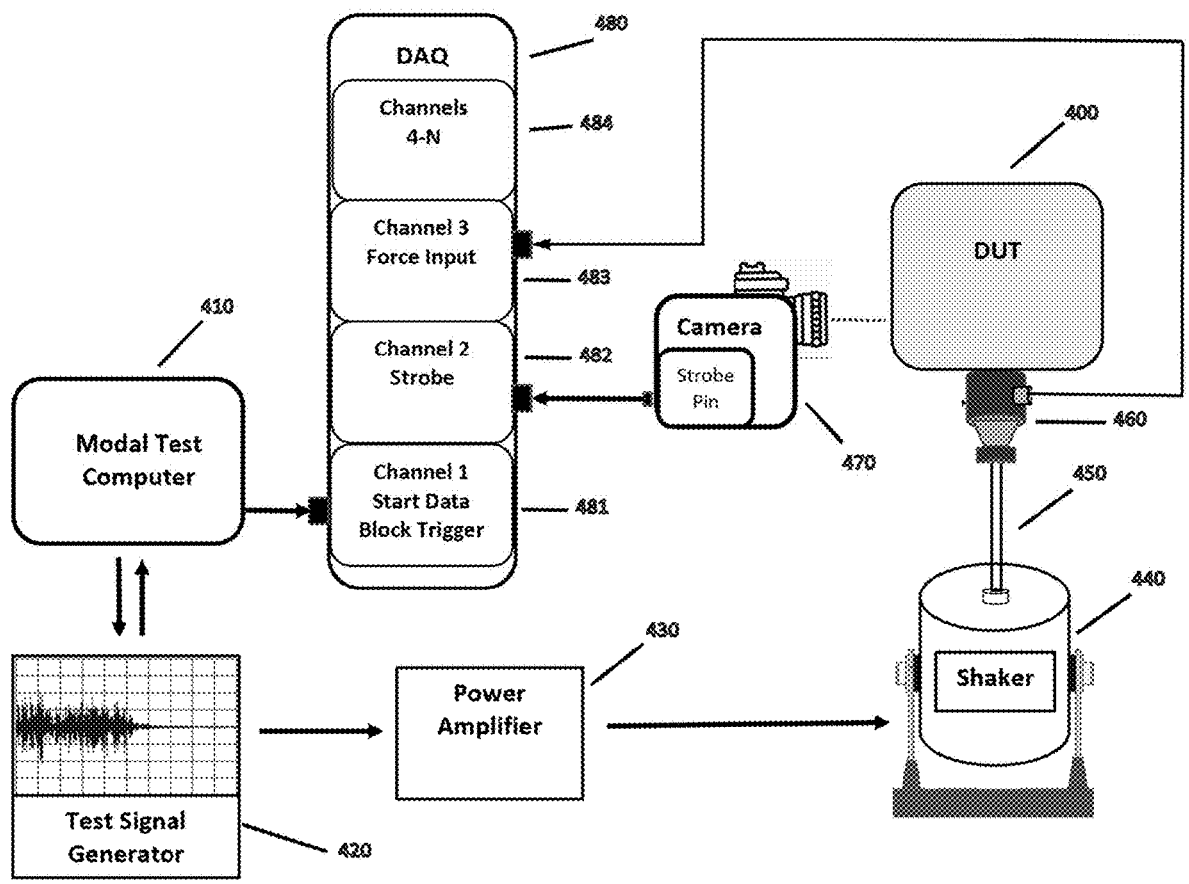
FIG. 2B is a diagram illustration of changes to the modal test setup when the stimulus to the DUT is provided by a modal shaker instead of an impact hammer.

In some modal test applications, a modal shaker is used instead of an impact hammer and this results in a slightly modified test setup as shown in FIG. 2B. When a modal shaker is used the user must select the type of test signal that is to be applied to the DUT labelled as 400. The user will select from options such as random, burst random, pseudo-random, periodic random, sine-chirp, or step sine available on the Modal test computer software denoted by numeral 410 such and a signal generator denoted by numeral 420 will construct the test signal which is passed to a power amplifier denoted by numeral 430 that drives the modal shaker denoted by numeral 440. The stinger denoted by numeral 450 mounted to the modal shaker and mates to a force sensor denoted by numeral 460 that contacts for DUT. When using a modal shaker the time timing of the data with respect to the start of the test signal is critical and the modal test computer in concert with the test signal generator will provide a test signal start trigger that is connected to channel 1 denoted by numeral 481 of the multichannel DAQ denoted by numeral 480. This test signal start trigger replaces the impact hammer trigger shown in FIG. 2A. The strobe output from the camera denoted by numeral 470 goes into channel 2 denoted by numeral 482. The force sensor output goes into channel 3 denoted by numeral 483 and any other sensors mounted on the DUT would go into the additional channels available on the DAQ.

In the asynchronous configuration, the DAQ and camera are using separate asynchronous capture clocks. To provide a means for a best effort synchronization between the camera and the DAQ, a camera frame capture strobe signal 340, is provided as an input to Channel 2 (i.e., denoted by reference numeral 360), on the multichannel DAQ device. This signal provides an electrical indication of the precise time in which the camera captures each frame. By locating the strobe edge transitions in the digitized strobe signal time series, one can now time align the DAQ samples (input signal) to the camera frames (output signals). The rising (or falling) edge can be linearly interpolated to improve the time resolution of the strobe event. The signals sampled from channels 1 and 2 of the DAQ are presented together in FIG. 3. The impact hammer signal, referred to as "stimulus" for which "excitation event" is synonymous, and captured on channel 1 is the lighter gray trace and the camera strobe signal on channel 2 is the darker gated pulses. Software routines may be employed to determine the location of the impact hammer event with respect to a specific frame the camera and establish the timing relationship between the samples from hammer signal and the accelerometer signals captured by the DAQ and captured camera frames. The data sets captured for processing the FRFs may include pre- and post-stimulus periods as determined by the user selections when setting up the test options. In modal test where a modal shaker provides the input stimulus, it is more common that the data sets collected will be begin at the start test signal trigger, but pre-trigger options are available.

Commercial off the shelf computer vision cameras often are sold with features such as input pins allowing external frame capture synchronization and(or) output pins routing the frame capture signal to other cameras for synchronized acquisition (strobe). Such cameras often provide embedded information in the frame header data of each captured frame. This data often contains high resolution timestamp information or information about the GPIO pin states at the time the frame was captured. This strobe data supports a means for synchronization by indicating the precise frame where the strobe signal was enabled. Data alignment can be achieved by searching the frame header data in the frame sequence to locate the first strobe signal assertion and the first sample where the strobe signal is located the corresponding DAQ data stream.

Figure 3:
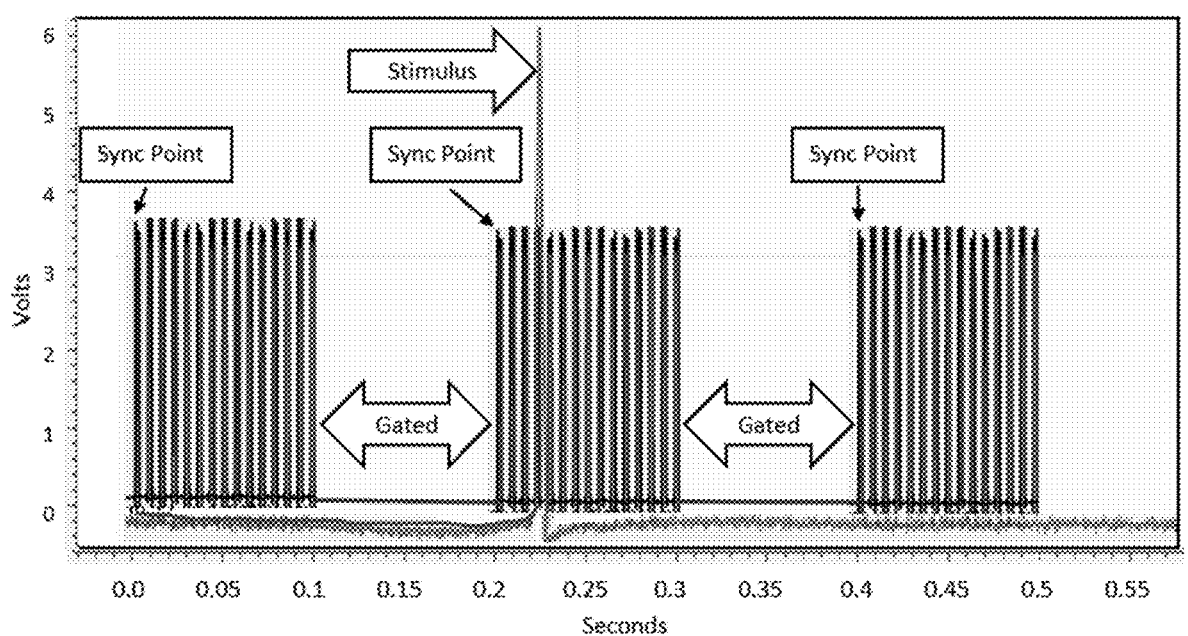
FIG. 3 is a graph that illustrates the relationship between the asynchronous data acquisition channels (hammer stimulus—lighter/gray and camera strobe—dark blue).

Another method of establishing novel synchronization starting points, involves gating the frame capture strobe pin on and off periodically to create distinct synchronization regions, shown with the "Gated" label in FIG. 3. Strobe pins are often referred to as General Purpose Input/Output (GPIO). All the strobe data is analyzed to locate each strobe event, and more importantly the start of each gated region. A gated region start is where the camera strobe signal is enabled or disabled. This location is important because it can be uniquely located in both the DAQ strobe stream and the camera frame header information. The camera frame header information tells us if the GPIO strobe output was enabled when the frame was captured. The format of this information as stored in each frame is shown in FIG. 4. At the transition between gated regions, the current frame would have the GPIO pin state (500) as unset, while the next frame would show the GPIO pin state as set. The position of this transition in the frame buffer is significant as it would be a good candidate for a synchronization point.

Figure 5:
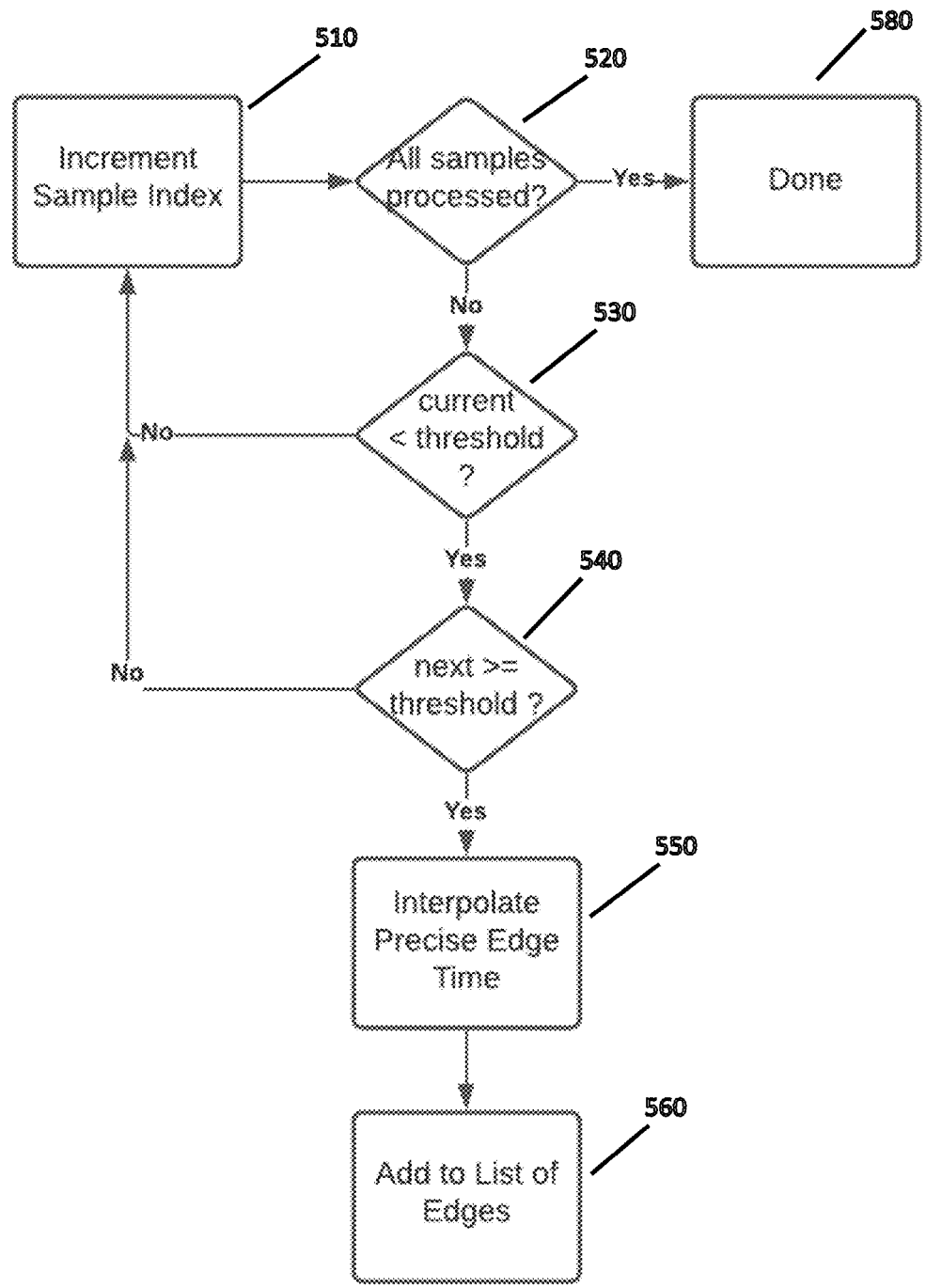
FIG. 5 is a flowchart of the algorithm used to locate the start of a gated region in the DAQ data stream when the impulse occurs, according to multiple embodiments and alternatives.

To locate the start of the gated region in the DAQ data stream for the strobe signal, one first uses the locate GPIO edge times algorithm presented in FIG. 5 to create a time record of all the camera frame capture times by incrementing through all of the sampled data as shown in steps 510 and 520 and continues until all samples are processed in step 580, (when the strobe is enabled during the gated region). Once the algorithm locates the two strobe events, current in step 530 and next in step 540, surrounding the start of the impact event, then the following equations (Eq. 1 and Eq. 2) are used to locate the exact time for the starting edge of the impulse event as shown in step 550 and added to the list of edges in step 560:

$$x=(\text{threshold}-\text{current})/m \qquad \text{Eq. 1}$$

where m=next−current $$\text{time}_{edge}=ts*(\text{index}+x) \qquad \text{Eq. 2}$$

where ts=1/samplerate

Figure 6:
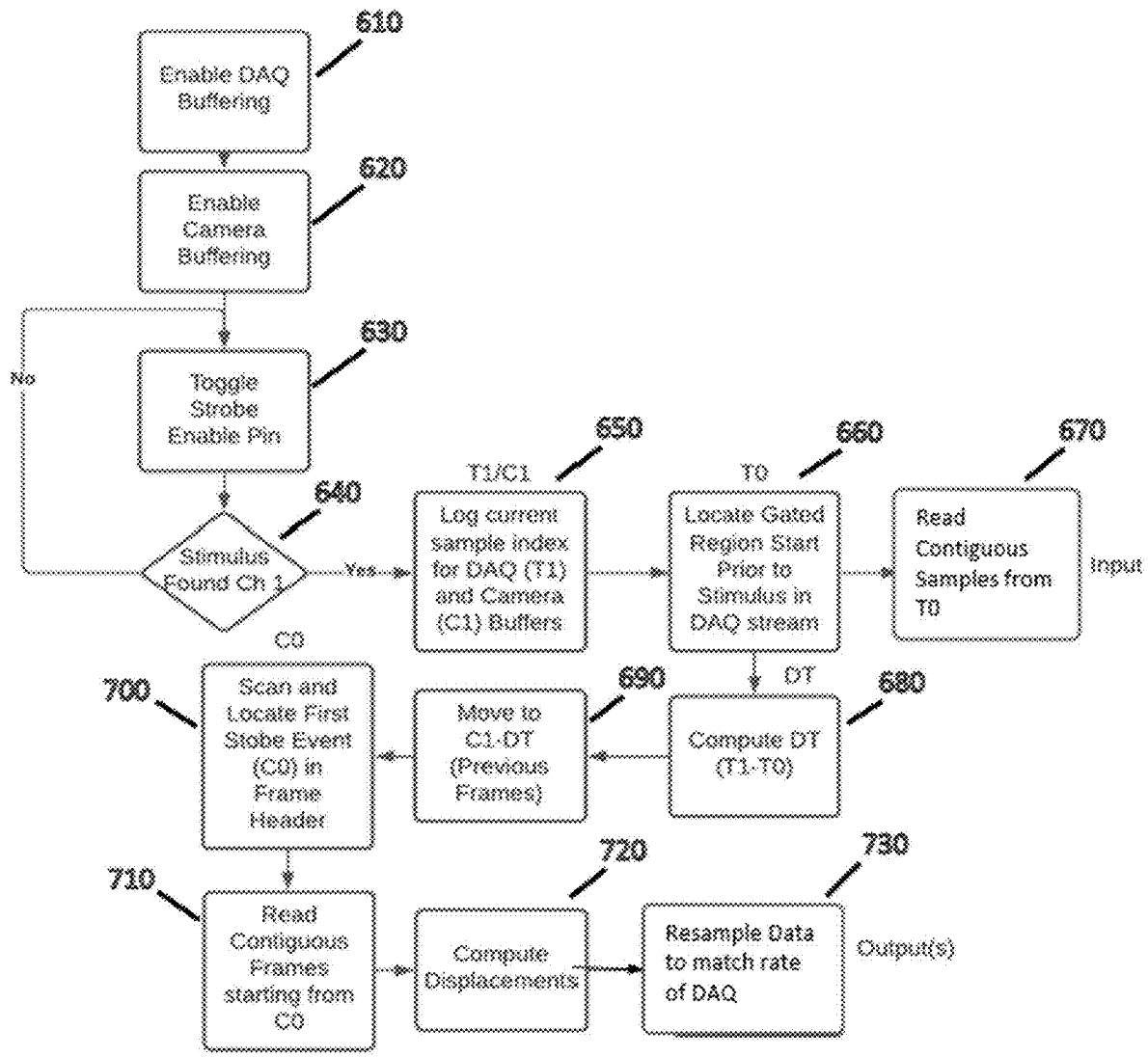
FIG. 6 provides a DAQ-to-camera alignment flow diagram, according to multiple embodiments and alternatives.

The algorithm also computes a distance between strobe events, which facilitates the location of gated regions by detecting gaps larger than the camera frame sample rate. Once a gap is located, one sets the index in the buffer and scan to the end of the gap, which is the start of the gated region. To create a completely aligned set of data from the DAQ and camera data streams, buffered in steps 610 and 620, suitable for modal analysis, one performs the following steps outlined in the flowchart provided in FIG. 6. Synchronization points in both the camera frame buffer and the DAQ input buffer are located in step 650 relative to the start of the gated region represented in step 660, by determining which strobe signal occurs at the same time as the start of the stimulus signal (CO and TO) in steps 630 and 640. From these locations, a contiguous array of data 670 can be extracted from the buffers that represent input and output arrays with starting points that are time-aligned as shown in steps 680, 690, 700, and 710. Because the video camera data contains a multiple of pixels that might be desirable to track over time, a separate step is needed to compute the pixel motion of each feature shown in step 720, resulting in a separate output signal for each.

As a final step, the frame rates of the camera and the DAQ need to be converted to the same rate as shown in step 730. This can be accomplished by the following means:
1. Interpolate or up-sample the camera displacement signals to match the DAQ rate.
2. Decimation or down-sample the DAQ rate to match the displacement signal rate.
3. Combination of the up-sampling the displacement signal and down-sampling the DAQ signal to reach the same common rate.

Figure 7:
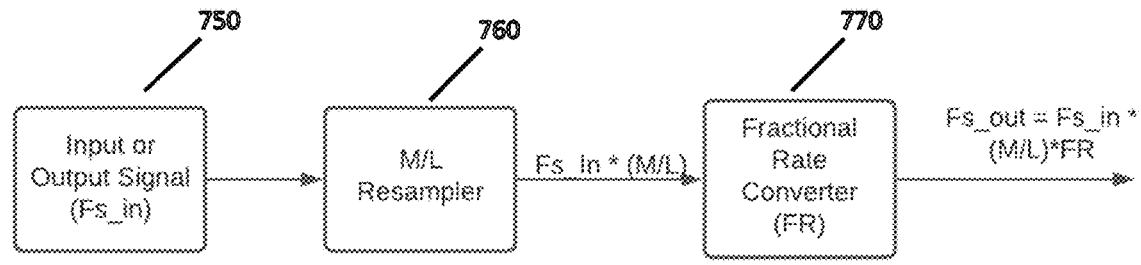
FIG. 7 is a diagram illustrating the resampling process applied to the input signal measured by the DAQ, according to multiple embodiments and alternatives.

The term down-sampling implies conventional signal processing techniques of applying appropriate low-pass decimation antialiasing filters for down-sampling. As a note, the term up-sampling implies conventional signal processing techniques of applying appropriate anti-imaging filters for up-sampling. For simplicity, the design recommends a rational up-sample to down-sample ratio, lending to simple FIR filter design. However, this design can be supplemented to use a fractional rate converter (Farrow-Filter, etc.) to fine tune the rate conversion. This is necessary in cases where the clock rates are not related by a rational ratio, or if the nominal clock rate ratio drifts over time. This process is outlined in the steps shown in FIG. 7 where the original input or output signal 750 is resampled in steps 760 and 770 where M and L are interpolation and decimation factors, respectively.

The goal of this system is to obtain a highly accurate time alignment of the data from the camera and the DAQ. However, errors can arise due to ever-changing clock drift between the two sample clocks, or variations in the nominal frequencies as a function of the ppm tolerance of the sample clock. Although the re-sampler scheme shown above is capable of correcting for fractional rate conversions, it still relies on two assumptions:
1. The clock resampling ratio is stationary, meaning it does not change over time. In practice, this will never be the case, but in some cases the drift error may be tolerable for the application.
2. The clock resampling ratio can be properly estimated. Assuming that the clock drift is acceptable, the nominal clock frequencies assumed by the re-sampler must be close enough to nominal frequencies found i1n any camera to DAQ pairing. Meaning the manufacturer tolerances of both products must be very tight.

With the above assumptions met, a DSP resampling routine must properly account for the filtering delays from the integer and fractional converters and not introduce phase delay errors. For this reason, it is advantageous to have a simple integer based resampling scheme.

Figure 8A:
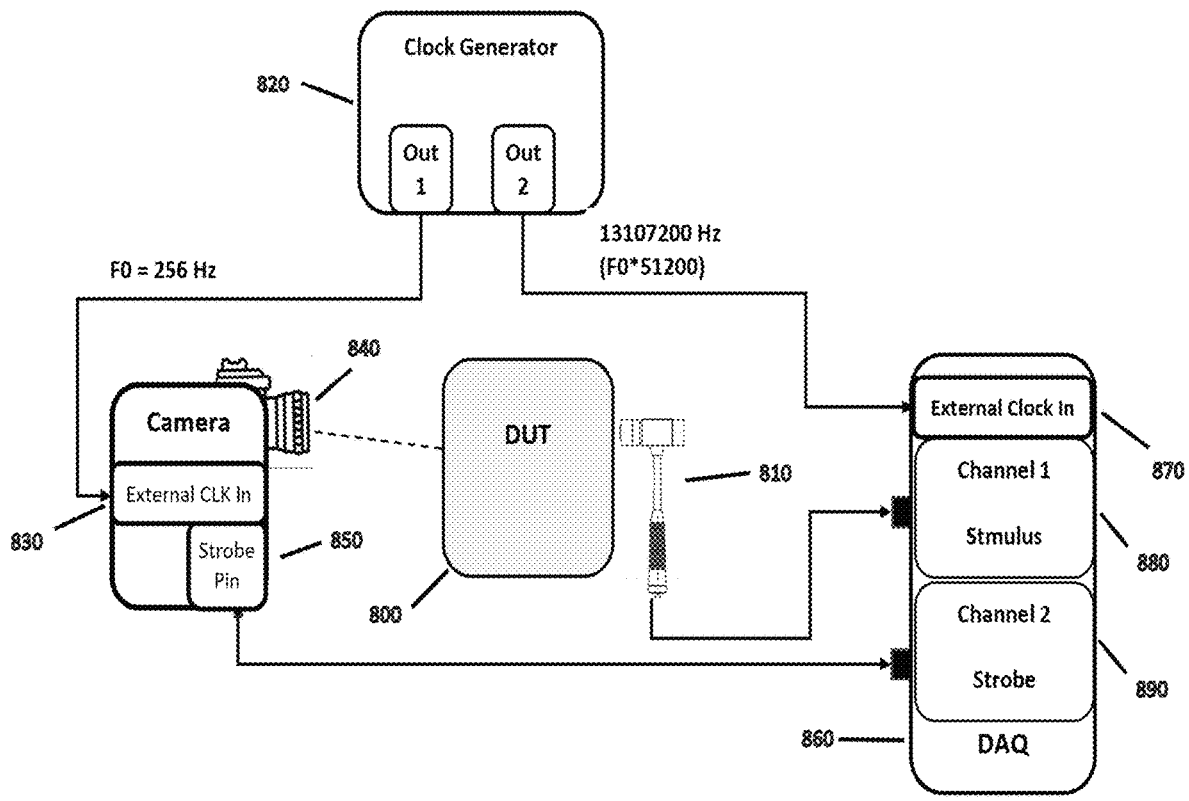
FIG. 8A is a schematic diagram illustrating a second hardware configuration using a synchronous clock configuration such that both the camera and DAQ are clocked to the same oscillator with an impact hammer providing the input signal, according to multiple embodiments and alternatives.

In an alternate embodiment, aspects of a second hardware configuration using a synchronous clock configuration are shown in FIG. 8A where the DUT 800, is being struck by an instrumented hammer 810. In this exemplary arrangement, both the camera, 840, and DAQ, 860, are clocked to the same oscillator, 820. Clock Out 1 is connected to the External Clock In, 830, of the camera and the Clock Out 2 is connected to the External Clock In, 870, of the DAQ. The input stimulus signal from the impact hammer is the input for Channel 1 (denoted by reference numeral 880), of the DAQ and the strobe signal 850 from the camera is the input for Channel 2 (denoted by reference numeral 890), of the DAQ. The strobe signal may be omitted in some embodiments when using a master synchronous clock to drive the sampling for both the DAQ and the camera.

Figure 8B:
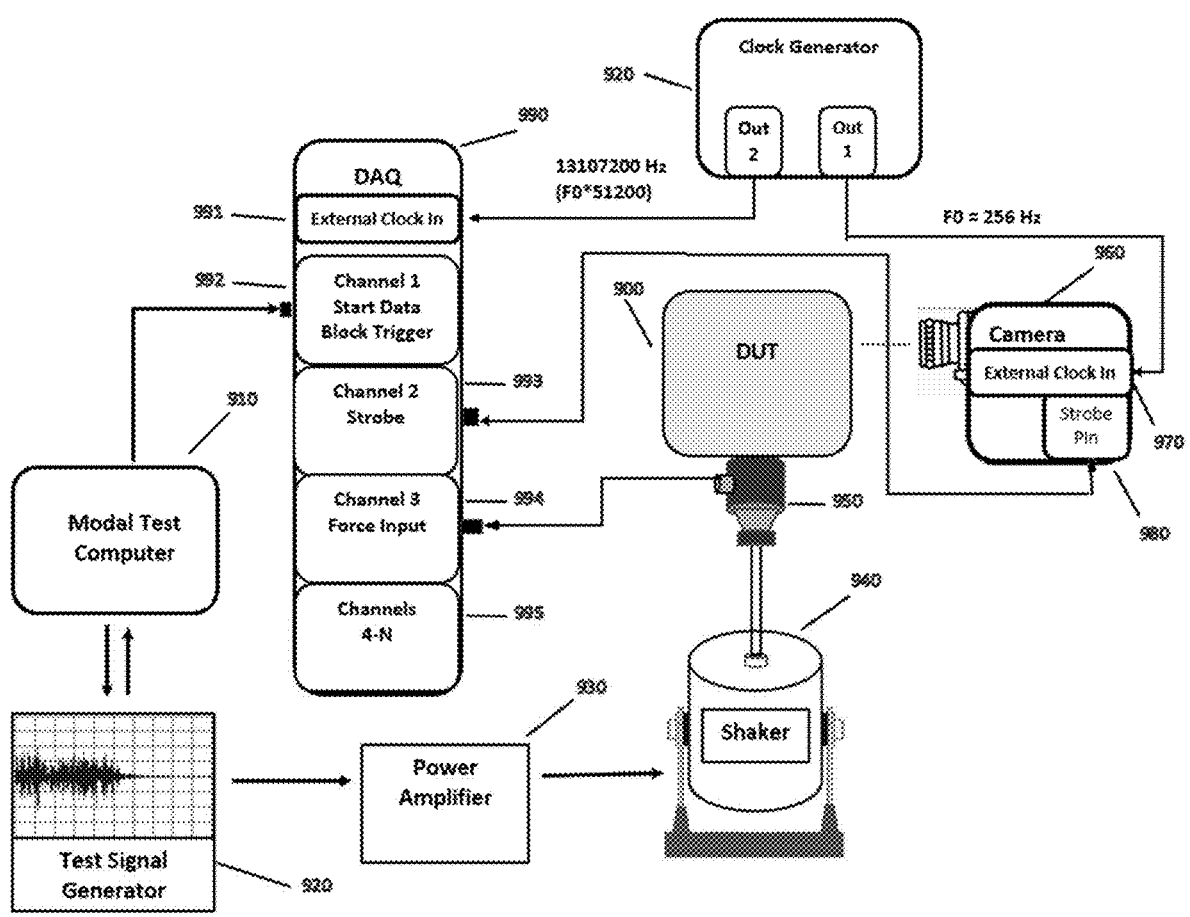
FIG. 8B is a schematic diagram illustrating a second hardware configuration using a synchronous clock configuration such that both the camera and DAQ are clocked to the same oscillator with a modal shaker providing the input signal, according to multiple embodiments and alternatives.

FIG. 8B is a diagram of this synchronous clock hardware configuration is used when a modal shaker 940 is the source of the input signal for the DUT 900. When a modal shaker is used the user must select the type of test signal that is to be applied to the DUT. The user will select from options such as random, burst random, pseudo-random, periodic random, sine-chirp, or step sine available on the modal test computer software denoted by numeral 910 such and a signal generator denoted by numeral 920 will construct the test signal which is passed to a power amplifier denoted by numeral 930 that drives the modal shaker In this exemplary arrangement, both the camera, 960, and DAQ, 990, are clocked to the same oscillator, 920. Clock Out 1 is connected to the External Clock In, 970, of the camera and the Clock Out 2 is connected to the External Clock In, 991, of the DAQ. The start data block trigger generated by the modal test computer 910 in combination with test signal generator 920 is the input for Channel 1 (denoted by reference numeral 992), of the DAQ; and the strobe signal 980 from the camera is the input for Channel 2 (denoted by reference numeral 993), of the DAQ; and the input stimulus signal measured by the force sensor 950 is the input for Channel 3 (denoted by reference numeral 994), of the DAQ. In some embodiments, other sensors, such as accelerometers, mounted to the DUT may serve to provide calibration measurements or output measurements from locations that cannot be viewed by the camera and will be inputs for the remaining channels, 4 through N, of the DAQ.

Figure 9:
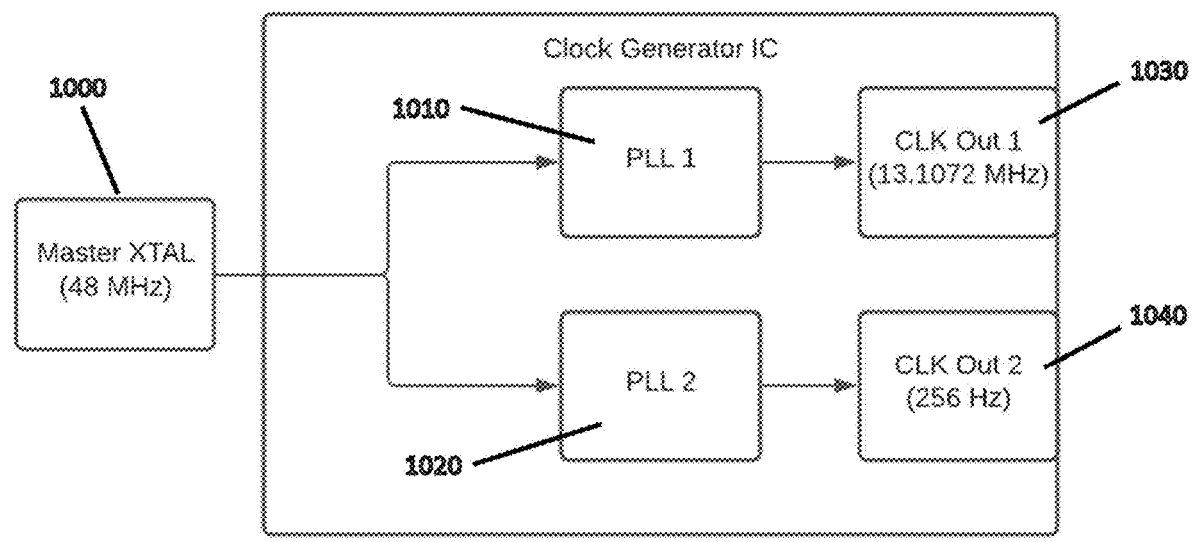
FIG. 9 shows the architecture of a commercially available clock generator IC which generates the synchronization pulses.

Currently available integrated circuits from companies such as Silicon Laboratories (Austin, Tex.) have clock generators and jitter attenuation that provide this functionality and allow for configuring multiple clock outputs at different frequencies. In some embodiments, the clock outputs are synchronized pulses. An exemplary architecture of a clock generator ICs is shown below in FIG. 9. In some embodiments, a feature of these chips is utilized to allow a user to configure internal Phase-Locked Loops (PLLs), 1010 and 1020, and convert the master clock, 1000, input frequency to specific clock output frequencies at each output pin, 1030 and 1040, respectively. In some embodiments provided for herein, a favorable arrangement for the system would be a frequency of 13.1072 MHz at clock output 1 for the ADC master clock. This is a common master clock frequency for sigma-delta ADCs used in vibration analysis. Sigma-delta converters have an internal oversampling mechanism that results in the effective sample rate=master clock/divisor, where the divisor equals 1024, 512, or 256. For the above example, the divisor is assumed to be 1024, resulting in a DAQ acquisition rate of 13.1072 MHZ/ 1024=51,200 samples per second. Clock output 2 would be configured for a rate that is an integer ratio to the ADC clock. In this example one would set the clock 2 output to be at 256 Hz, which is 200 times slower than the DAQ rate.

Figure 10:
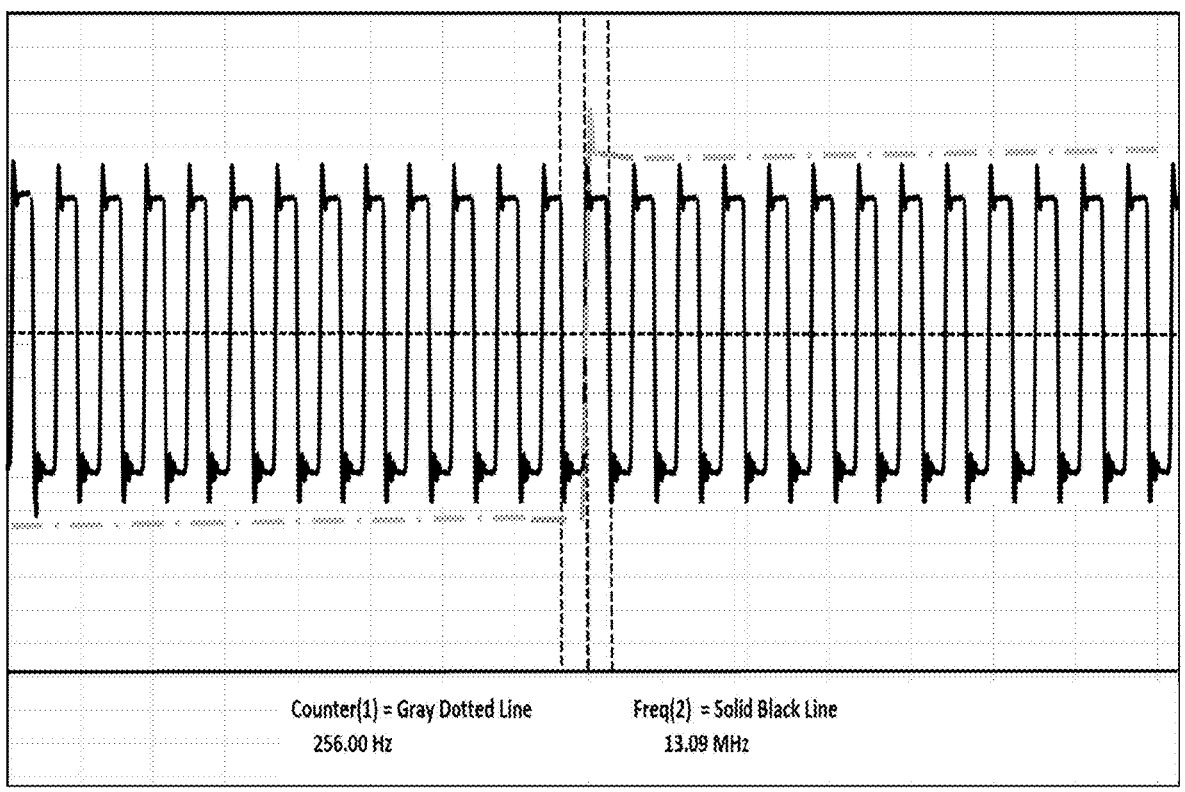
FIG. 10 shows respective signals from the synchronized camera and DAQ clocks in the case of a 256 Hz camera and a 13.1072 MHz DAQ, according to multiple embodiments and alternatives.
Figure 11:
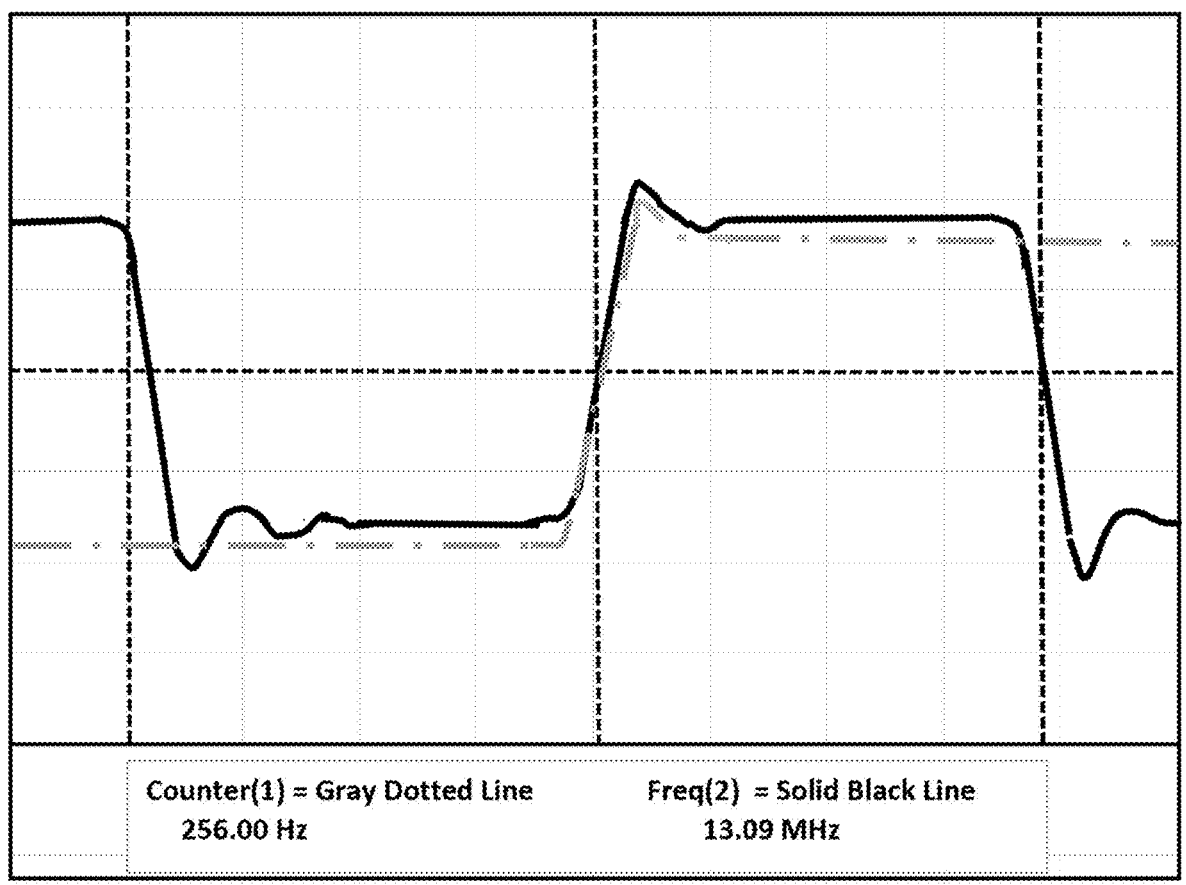
FIG. 11 shows respective signals from the clock edge phase delay between a synchronized camera and DAQ clock representing a difference of less than 100 picoseconds, according to multiple embodiments and alternatives.

Since these clocks are both derived from the same master input clock, they are inherently synchronized, and any frequency variation or drift of the master input clock is common to both clock outputs. The scope capture in FIG. 10 shows the DAQ ADC master clock (solid black line) overlayed with the camera frame capture clock (dotted gray line). In FIG. 10, it is difficult to see any time difference on the time scale presented and even in FIG. 11, the delay phase of the two edges is so miniscule (picoseconds) it is difficult to measure with a 70 MHz scope. This degree of synchronization allows for the above re-sampling scheme to be simplified to a simple integer up-sampler with a factor of 200.

Figure 12:
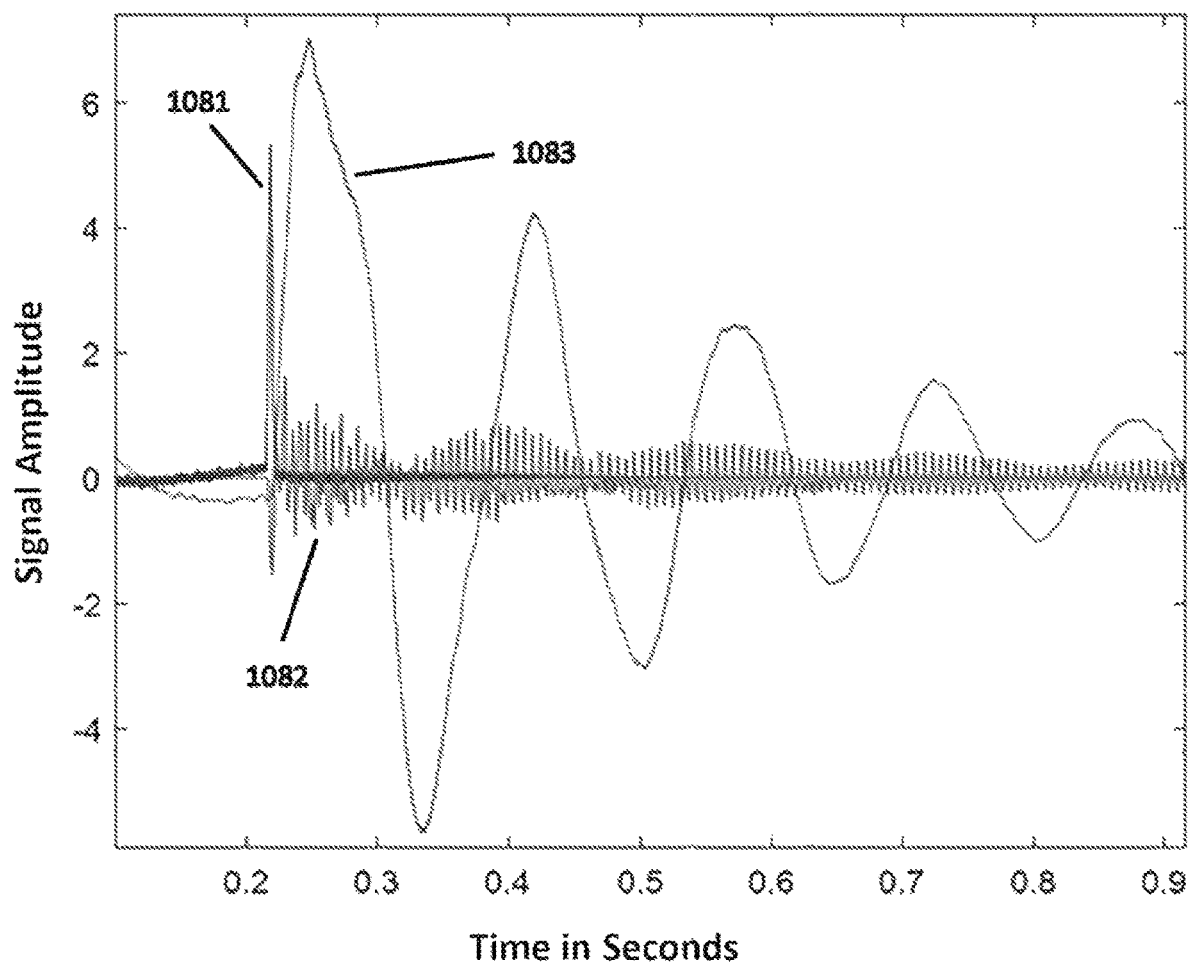
FIG. 12 presents a graph of an input signal from the impact hammer and the response measured by the camera along with the synchronization pulses, according to multiple embodiments and alternatives.

The synchronized input and output signals are shown in FIG. 12 demonstrating the effectiveness of the synchronization methods. The impact hammer signal is labelled 1081, the response signal measured by an accelerometer is labelled 1082, and the displacement response measured by the camera is labelled 1083.

Figure 13A:
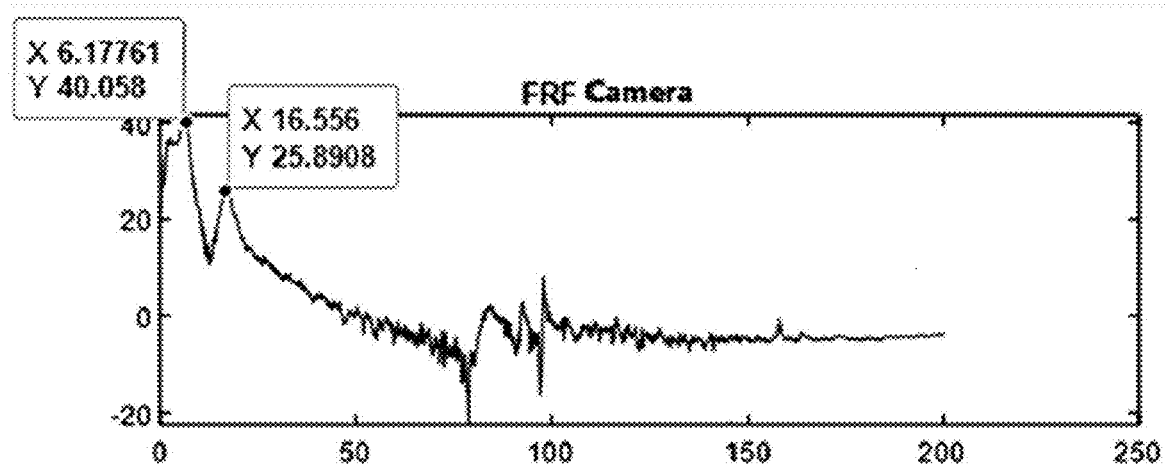
FIGS. 13A and B present a frequency response function (FRF) calculated from synchronized data sources, according to multiple embodiments and alternatives.
Figure 13B:
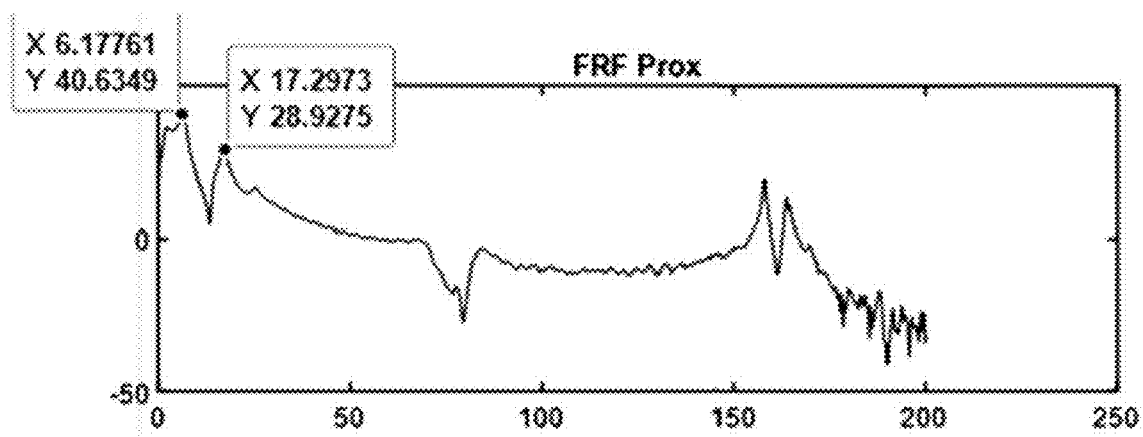
Figure 14A:
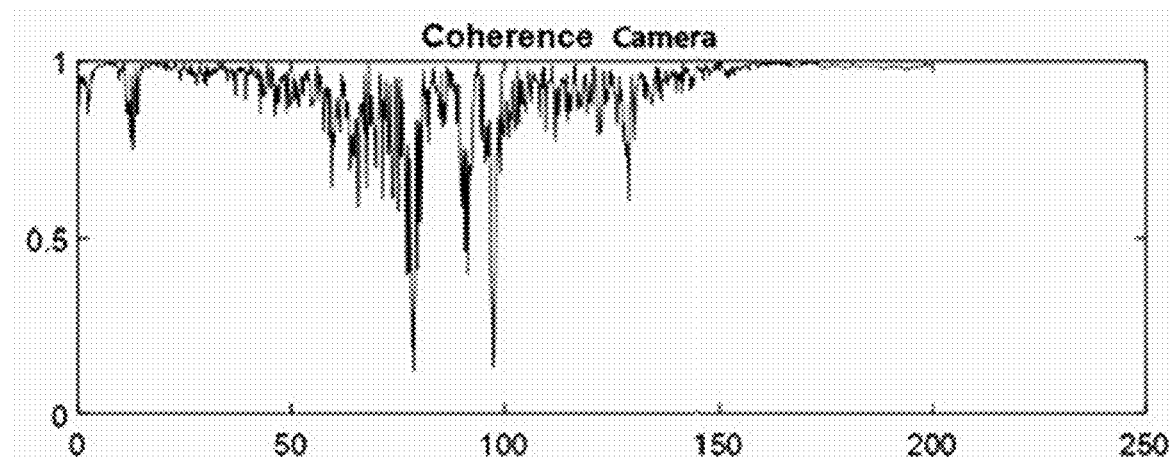
FIGS. 14A and B present respective graphs of coherence calculated from synchronized data sources, according to multiple embodiments and alternatives.
Figure 14B:
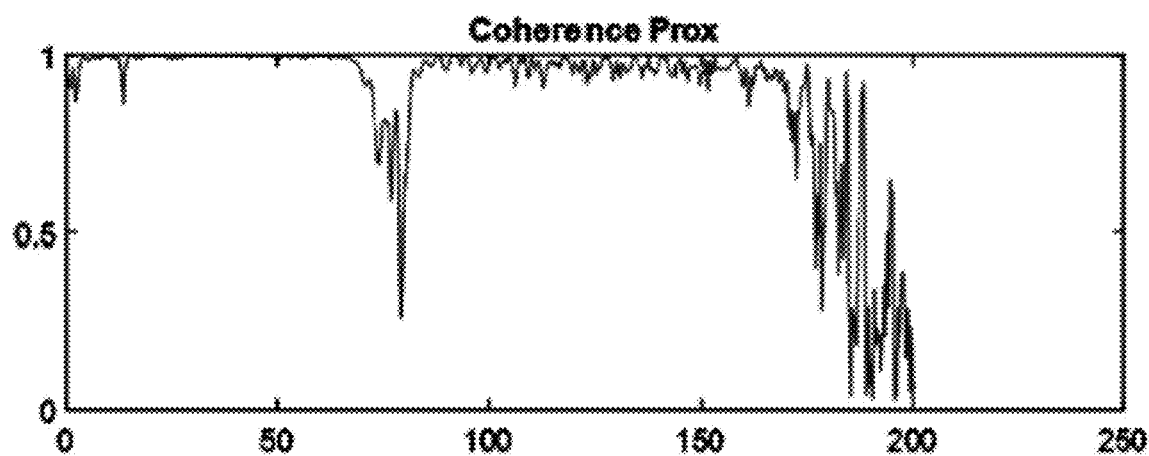

In another test, data was collected using a proximity probe displacement sensor as a reference against the output response as measured with the camera at the same spatial location. The FRFs are compared in FIGS. 13-B and the coherence is compared in FIGS. 14A-B. The FRF results plotted in FIGS. 13A-B show consistent frequency peaks for the reference and camera data for the resonances at 6.177 Hz (FIG. 13B) and 16.56 Hz (FIG. 13A), respectively. The coherence plots in FIGS. 14A-B show a similar shape from 0 Hz to 80 Hz. Formulas for the calculation of FRFs and the coherence function are well known to those skilled in the art.

In an alternate embodiment, the alignment can be achieved without the need of specific synchronization markers, but by correlating the camera displacement to data from a similar "reference" sensor captured synchronously to the input stimulus. This "blind" synchronization assumes that both the camera displacement and reference sensor data will be similar in waveshape, for example the camera displacement compared to a proximity probe or distance sensor. Using the traditional cross-correlation equation (Eq. 3) for the camera displacement and the reference sensor can be computed and the lag between the signals can be determined from the location of the maximum value. The lag, m, corresponds to the number of samples the camera data needs to be shifted to achieve alignment to the reference sensor.

$$\hat{R}_{xy}(m) = \begin{cases} \sum_{n=0}^{N-m-1} x_{n+m} y_n^*, & m \geq 0, \\ \hat{R}_{xy}^*(-m), & m < 0. \end{cases} \quad \text{Eq. 3}$$

Another means of synchronization is accomplished using an optical event, such as a variation of light intensity. This alternate embodiment involves sampling a photodiode with one of the synchronous DAQ channels while the camera data is acquired. A light variation transient would be fired (light pulse flash) and captured in the camera stream as frame-to-frame variation in light intensity of all pixels. The flash would be recorded as a rising or falling edge transition in the DAQ stream sampling the photodiode. Data alignment is achieved by aligning the edge transition to the first frame where the pixel light intensity change is observed.

In a typical modal test, the DUT may be struck with the impact hammer multiple times and a set of data is captured for the input with the DAQ and for the response using the video camera. Similarly, multiple independent data sets would be captured if the excitation source was a modal shaker. The embodiments described herein are repeated on two or more sets of data to allow averaging for the purpose of reducing noise and producing valid coherence measurements.

Alternate embodiments for modal testing could employ more than one camera. Additional cameras can be synched to the first camera by running a cable between the Sync Pin connectors on the cameras. Each time the master camera acquires a video frame, the other cameras will collect a frame at the same time. The same process used to synchronize the data collected on the first camera will be applied to the output from the other cameras. Using this method, video data can be acquired from different spatial locations simultaneously which is beneficial in case one of the cameras has a perspective which can see portions of the DUT which are not viewable to the other cameras.

Figure 15:
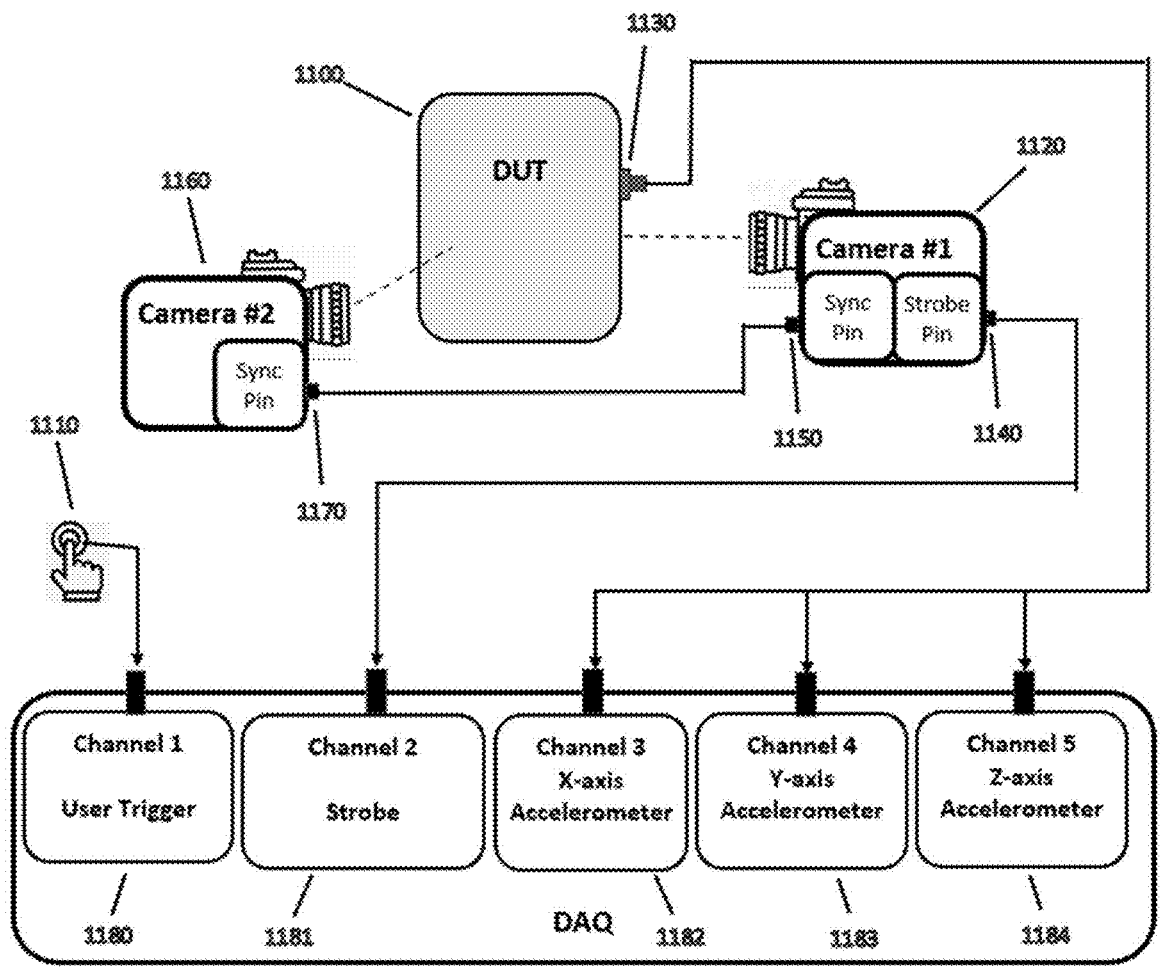
FIG. 15 is a schematic diagram of a setup for an operational modal test where no measured input signal is available and where the asynchronous DAQ and a camera with a strobe pin output are synchronized using software routines, according to multiple embodiments and alternatives.
Figure 16:
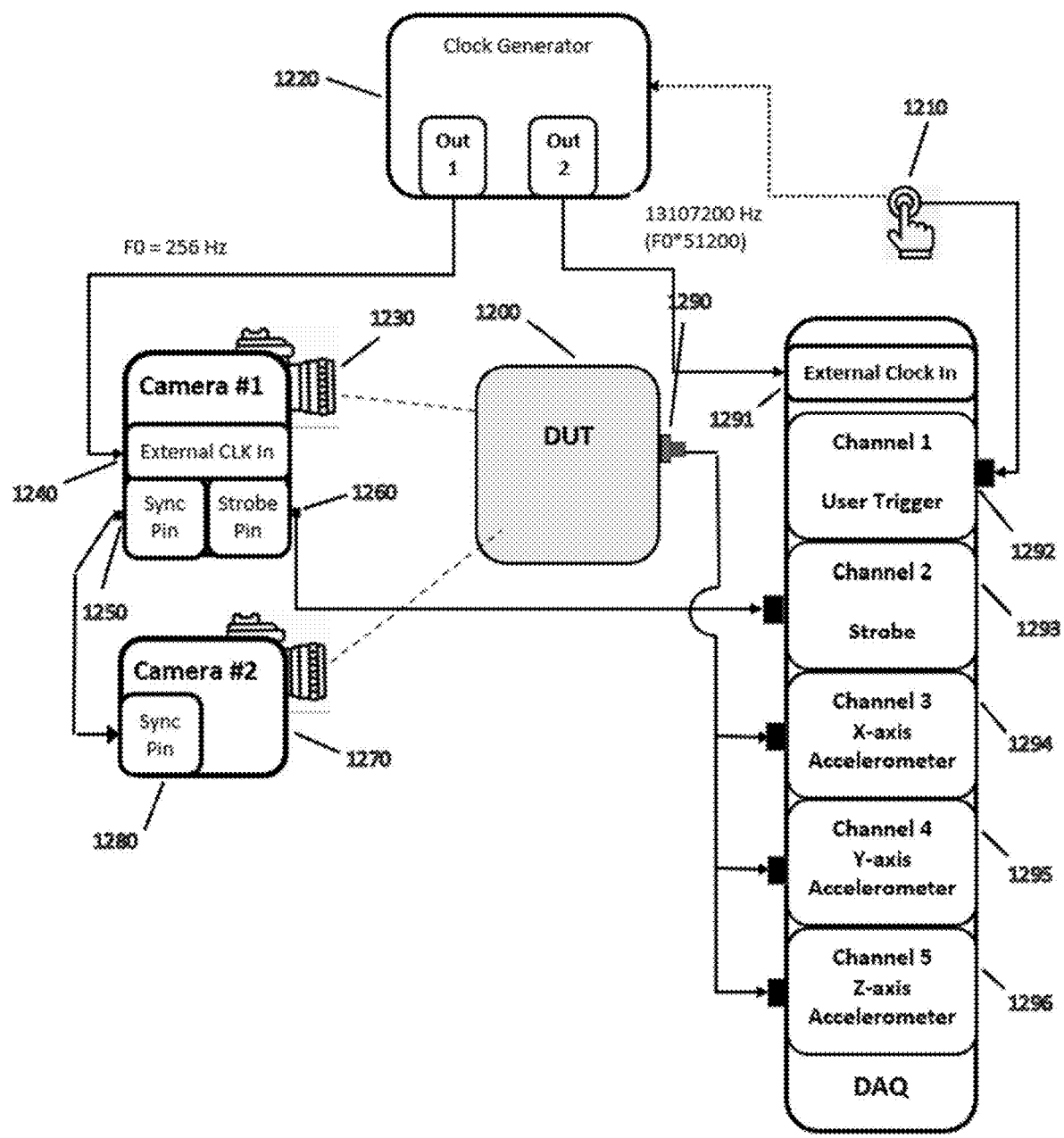
FIG. 16 is a schematic diagram of a system for making operational modal measurements combining camera and non-camera modalities, according to multiple embodiments and alternatives.

The description of modal testing herein has addressed applications where the input force applied to the DUT can be measured. In this case, the FRFs used to perform the modal parameters are based on cross signal calculations versus this measured input signal. In some applications, however, an adequate input signal cannot be generated or measured due to the size of the structure or competing background input forces. In this case, termed operational modal testing, no input force is applied to the DUT, and the vibratory motion results from non-measured forces present in the surrounding environment. To obtain FRFs, a reference location on the structure is established and serves as the input signal. In this case, the vibratory motion at the reference location is often measured with a triaxial accelerometer. Other sensors, such as displacement sensors, laser vibrometers, or other could be used but are often less convenient. If any other sensor is used other than another video camera, then the same problem of synchronizing the signals measured from the DAQ with the camera frames is very similar to synchronizing with the input force signal described herein. FIGS. 15 and 16 provide schematic diagrams of the systems that could make operational modal measurements using more two cameras to measure the output vibratory motion and using a triaxial accelerometer positioned at a reference location as the input.

FIG. 15 is analogous to the case described in FIG. 2A where the asynchronous DAQ and a camera with a strobe pin output are synchronized using software routines. In this case, an external trigger 1110 controlled by the user initiates the capture of each block of data, which can be implemented via software routines on a computer. In operational modal tests, a large number of blocks of data are captured to reduce the noise present in the calculated FRFs. In the system shown in this configuration, a DUT labelled as 1100 is instrumented with multiple measurement sensors. The first sensor is a high-speed, high-resolution camera, 1120. The second sensor is an optional high-speed, high-resolution camera, 1160. The timing of the frames captured by each camera is controlled by connecting the Sync Pins, 1150 and 1170, on each camera so that frames are acquired at exactly the same time on each camera. The third sensor is a triaxial accelerometer, 1130, that provides reference measurements in all the three axes. For the example depicted in FIG. 15, a user trigger signal is used to initiate the acquisition of each block of data and the video recordings. The data from each of these three sensors is being captured by two separate digital capture devices. The user trigger signal is being captured by Channel 1, 1180, and the X-axis and Y-axis signals from the accelerometer are being captured by channels 3 through 5, labelled 1182, 1183, and 1184, respectively, of a multichannel ADC which convert the analog voltages to digital signals with a sample rate of 51,200 samples per second in accordance with the exemplary calculation herein. The DUT is also being captured by video cameras, 1120 and 1160, with a resolution of 1920×1080 pixels at a sample rate of 128 frames per second. In this configuration both the camera and the ADC have separate sampling clocks, which are ideally configured to run at rates that are more conducive for sample rate conversion, like a rational up/down sample ratio. In this example, the ADC sampling rate is 400 times faster than the camera frame rate, an upsample ratio of 400.

To provide a means for a best effort synchronization between the camera and the DAQ, a camera frame capture strobe signal 1140, is provided as an input to Channel 2, 1181, on the multichannel DAQ device. As previously described herein, this signal provides an electrical indication of the precise time in which the camera captures each frame. By locating the strobe edge transitions in the digitized strobe signal time series, one can now time align the DAQ samples (input signal) to the camera frames (output signals). The rising (or falling) edge can be linearly interpolated to improve the time resolution of the strobe event. Software routines may be employed to determine the location of the user trigger event with respect to a specific frame the camera and establish the timing relationship between the samples from user trigger signal and the accelerometer signals captured by the DAQ and captured camera frames.

In an alternate embodiment for performing an operational modal test, aspects of a second hardware configuration using a synchronous clock configuration are shown in FIG. 16 where the DUT 1200. In this exemplary arrangement, both the camera, 1230, and DAQ are clocked to the same oscillator, 1220. Clock Out 1 is connected to the External Clock In, 1240, of the camera and the Clock Out 2 is connected to the External Clock In, 1291, of the DAQ. The user trigger signal is connected to the input for Channel 1, 1292, of the DAQ and serves to start the clock generator, and the strobe signal 1260 from the first camera is the input for Channel 2, 1293, of the DAQ. The strobe signal may be omitted in some embodiments when using a master synchronous clock to drive the sampling for both the DAQ and the camera. The triaxial accelerometer mounted at the reference location serves the purpose of the input signal in the FRF calculations and is captured on channels 3 through 5, 1294, 1295, and 1296, respectively, of the DAQ. An optional second video camera, 1270, captures video signal from a different spatial location. The frames on this camera are captured at the same time by means of a cable connecting the Sync Pins, 1250 and 1280, of both cameras.

As described before herein, available integrated circuits from companies such as Silicon Laboratories (Austin, Tex.) have clock generators and jitter attenuation that provide this functionality and allow for configuring multiple clock outputs at different frequencies. In some embodiments provided for herein, a favorable arrangement for the system would be a frequency of 13.1072 MHz at output 1 for the ADC master clock. This is a common master clock frequency for sigma-delta ADCs used in vibration analysis. In an exemplary arrangement, selecting the divisor to be 1024, results in a DAQ acquisition rate of 13.1072 MHZ/1024=51,200 samples per second. Clock output 2 would be configured for a rate that is an integer ratio to the ADC clock. In this example one would set the clock 2 output to be at 256 Hz, which is 200 times slower than the DAQ rate.

Since these clocks are both derived from the same master input clock, they are inherently synchronized, and any frequency variation or drift of the master input clock is common to both clock outputs. This selected setup allows for the above re-sampling scheme to be simplified to a simple integer up-sampler with a factor of 200. Other setup selections could be employed as would be obvious to those skilled in the art.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or conducted in various ways. Also, it is to be understood that words and phrases used herein are for the purpose of description and should not be regarded as limiting. The use herein of such words and phrases as "including," "such as," "comprising," "e.g.," "containing," or "having" and variations of those words is meant to encompass the items listed thereafter, and equivalents of those, as well as additional items.

Accordingly, the foregoing descriptions of embodiments and alternatives are meant to illustrate, rather than to serve as limits on the scope of what has been disclosed herein. The descriptions herein are not meant to limit the understanding of the embodiments to the precise forms disclosed. It will be understood by those having ordinary skill in the art that modifications and variations of these embodiments are reasonably possible in light of the above teachings and descriptions.

What is claimed is:

1. A system for performing a modal test on a structure using a video recording of the structure by measuring an input acceleration resulting from forces produced by one or more excitation sources and resulting in excitation events captured by a data acquisition system (DAQ) that produces and records one or more input signals, and measuring a response exhibited by the structure acquired by at least one video acquisition device, the system comprising:
    at least one video acquisition device for obtaining the video recording, wherein the video recording comprises a plurality of image frames divisible into a plurality of pixels;
    a processor configured to use a synchronization signal to establish a timing between the excitation events and response of the structure exhibited and acquired by the video acquisition device that acquires sampling data, wherein the sampling data comprises a video recording of motion of the structure, wherein an image frame is divisible into a plurality of pixels; and
    a computer program operating in the processor to:
        determine a starting point in time when at least one excitation event occurred relative to the one or more input signals recorded by the DAQ and a sequence of video frames present in the video recording from which one or more output signals are obtained in response to the excitation events;
        construct synchronized and resampled input and output signals from the one or more input and output signals;
        calculate frequency response functions and coherence functions from the one or more output signals from different spatial locations against the one or more input signals;
    averaging frequency response function values and coherence function values from independent data sets.

2. The system of claim 1, wherein a synchronization signal is derived from a strobe signal generated by the video acquisition device and recorded on one channel of the DAQ measuring the one or more input signals.

3. The system of claim 1, wherein a synchronization signal is derived from an external clock generator which produces two synchronized clock output signals, wherein the two synchronized clock output signals control a sampling rate of the DAQ and a frame rate of the video acquisition device.

4. The system of claim 1, wherein the computer program constructs the synchronized and resampled input and output signals using up or down sampling techniques.

5. The system of claim 1, wherein the DAQ is a multi-channel DAQ and at least a second signal is captured by at least one sensor that is not a video acquisition device.

6. The system of claim 1, wherein the excitation event is produced by a user that strikes the structure with an impact hammer generates a trigger pulse to provide an appropriate time for data acquisition to commence.

7. The system of claim 1, wherein the excitation event is produced by a modal test shaker that excites the structure and the computer program generates a trigger pulse that marks a start of a test signal with an initiation of a data acquisition sequence.

8. A system for performing an operational modal test on a structure using a video recording of the structure by measuring vibratory motion from one or more reference input locations resulting from unmeasured forces in a surrounding environment captured by a data acquisition system (DAQ) that produces and records one or more reference input signals associated with the vibratory motion, and measuring one or more output signals exhibited by the structure acquired by at least one video acquisition device, the system comprising:
- at least one video acquisition device for acquiring the video recording including sampling data representing the one or more output signals, wherein the sampling data comprises a video recording of motion of the structure, wherein an image frame is divisible into a plurality of pixels;
- a processor configured to use a synchronization signal to establish a timing for a response of the structure associated with the vibratory motion which is exhibited and acquired by the video acquisition device that acquires the sampling data; and
- a computer program operating in the processor to:
  - determine a starting point in time when a trigger event signal is initiated by a user to start a data acquisition event relative to the one or more reference input signals recorded by the DAQ and a sequence of video frames present in the video recording from which output signals are obtained;
  - construct synchronized and resampled input and output signals from the one or more reference input signals and the one or more output signals;
  - calculate frequency response functions and coherence functions from the one or more output signals from different spatial locations against one or more reference input signals; and
  - compute an average frequency response function and an average coherence function calculated from the frequency response functions and coherence functions measured from independent data sets.

9. The system of claim 8, wherein the DAQ is a multichannel DAQ, and wherein the synchronization signal is derived from a strobe signal generated by the video acquisition device and recorded on one channel of the DAQ measuring the input signal.

10. The system of claim 8, wherein the synchronization signal is derived from an external clock generator which produces two synchronized clock output signals, wherein the two synchronized clock output signals control a sampling rate of the DAQ and a frame rate of the video acquisition device.

11. The system of claim 8, wherein the computer program constructs the new input signals and new output signals using upsampling or downsampling techniques.

12. The system of claim 8, wherein the DAQ is a multichannel DAQ, and wherein one or more output signals comprises multiple output signals, at least one of which is obtained from at least one other sensor that is not a video acquisition device and captured by the multichannel DAQ.

* * * * *